United States Patent [19]

Reinert

[11] 4,257,396
[45] Mar. 24, 1981

[54] SOLAR COLLECTOR

[75] Inventor: Charles P. Reinert, Garvin, Minn.

[73] Assignee: Solarein, Inc., Buffalo, Minn.

[21] Appl. No.: 874,199

[22] Filed: Feb. 1, 1978

[51] Int. Cl.³ .............................................. F24J 3/02
[52] U.S. Cl. .................................... 126/426; 126/429; 126/445; 126/449
[58] Field of Search ............... 126/270, 271, 449, 450, 126/443, 426, 446; 237/1 A; 428/901, 357; D11/133, 139

[56] References Cited

U.S. PATENT DOCUMENTS

| 2,688,580 | 9/1954 | Fingerhut | 428/357 |
| 3,102,532 | 9/1963 | Shoemaker | 126/449 |
| 3,908,631 | 9/1975 | Rom | 126/426 |
| 3,975,925 | 4/1975 | Johnston | 126/449 |
| 4,020,826 | 5/1977 | Mole | 126/449 |
| 4,067,316 | 1/1978 | Brin et al. | 126/270 |
| 4,073,282 | 2/1978 | Schriefer, Jr. | 126/270 |
| 4,119,083 | 10/1978 | Heyen et al. | 126/270 |
| 4,123,003 | 10/1978 | Winston | 126/444 |
| 4,126,270 | 11/1978 | Hummel | 237/1 A |
| 4,129,117 | 12/1978 | Harvey | 126/449 |

Primary Examiner—James C. Yeung
Attorney, Agent, or Firm—Kinney, Lange, Braddock, Westman and Fairbairn

[57] ABSTRACT

A flexible solar collector may be readily attached to a structure, such as a house, mobile home or the like, and may be readily removed from the structure and rolled into a roll of small compass for storage when desired. The collector is of flexible tubular construction having an intermediate panel which defines a pair of chambers containing fibrous heat absorbers through which air is circulated.

In another embodiment of the solar collector, the fibers of the heat absorber are formed of metal. In another embodiment of the solar collector, the fibrous heat absorber is spaced from the light transmissive member so that air flowing through this space lowers the temperature of the inner surface of the light transmissive member and reduces thermal losses of the collector to the environment. In further embodiments, a pair of fibrous heat absorbers are used, which may be provided with a transparent radiation barrier therebetween.

12 Claims, 9 Drawing Figures

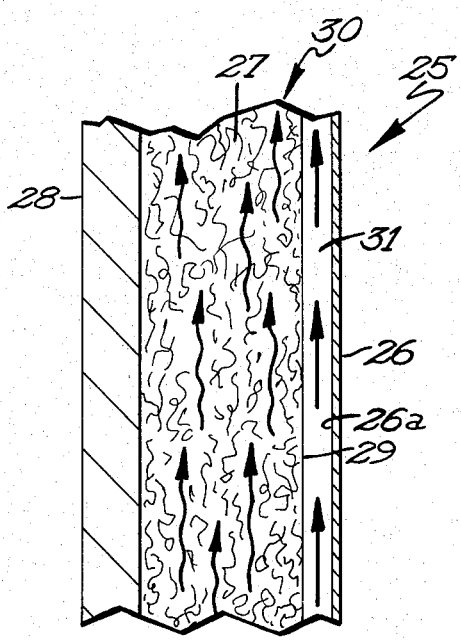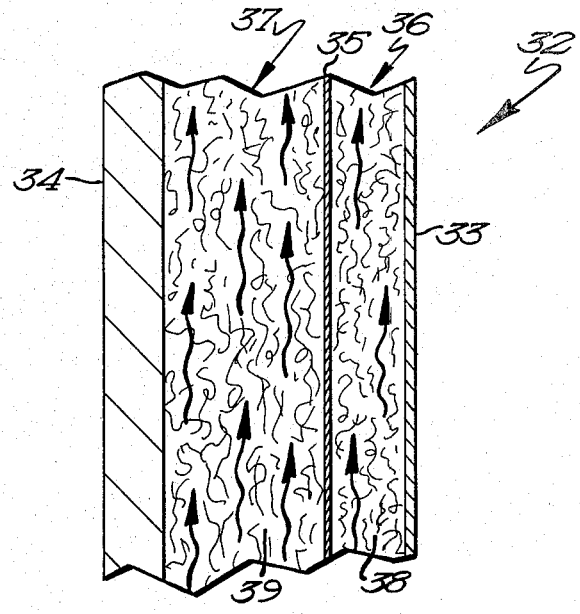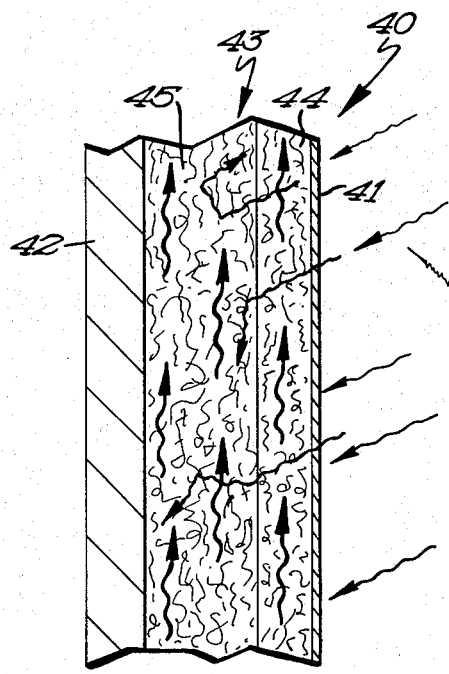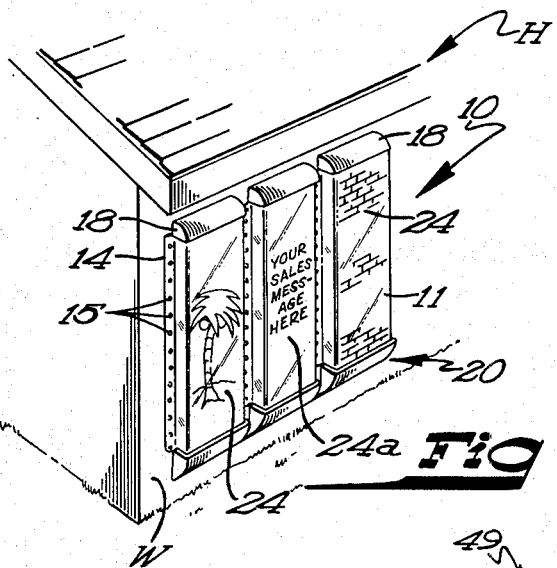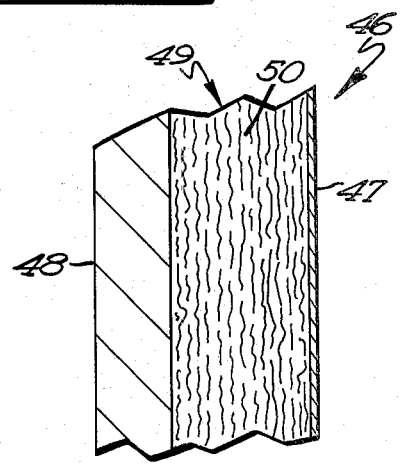

2

SOLAR COLLECTOR

SUMMARY OF THE INVENTION

This invention relates to solar collectors, and more particularly to solar collectors having improved fibrous heat absorbers.

It is a general object of this invention to provide a novel and improved solar collector, which is of simple and inexpensive construction, and which functions in a highly efficient manner.

A more specific object of this invention is the provision of a novel solar collector formed of flexible material, which may be easily attached to a structure, such as a house or mobile home, and which may be readily removed therefrom and rolled into a roll of small compass for storing.

Another object of this invention is to provide a novel solar collector having a fibrous heat absorber spaced from the light transmissive cover whereby when air is moved through the space adjacent the light transmissive cover, the temperature of the inner surface of the cover will be lowered and thereby minimize thermal losses to the environment.

A further object of this invention is to provide a novel solar collector having a pair of fibrous heat absorbers, the outermost heat absorber having a color corresponding to the decor of the associated buildings.

Another object of this invention is to provide a novel solar collector provided with a membrane between a pair of fibrous heat absorbers, wherein the membrane functions as a radiation barrier which serves to minimize infra-red radiation losses through the light transmissive cover.

A further object of this invention is to provide a novel solar collector having a novel fibrous heat absorber formed of metal fibers which have been treated to reduce infra-red radiation emission.

Another object of this invention is to provide a novel use of a solar collector wherein a solar collector may be used as media for both graphic representations and advertising purposes.

These and other objects and advantages of this invention will more fully appear from the following description made in connection with the accompanying drawings, wherein like reference characters refer to the same or similar parts throughout the several views.

FIGURES OF THE DRAWINGS

FIG. 5 is a cross-sectional view of a different embodiment of the solar collector;

FIG. 6 is a cross-sectional view of another embodiment of the solar collector;

FIG. 7 is a cross-sectional view of still another embodiment of the novel collector;

FIG. 8 is a perspective view illustrating graphic representations applied to the solar collector; and FIG. 9 is a cross-sectional view of the solar collector illustrating still another embodiment thereof.

DESCRIPTION OF THE PREFERRED EMBODIMENTS OF THE INVENTION

Figure 1:
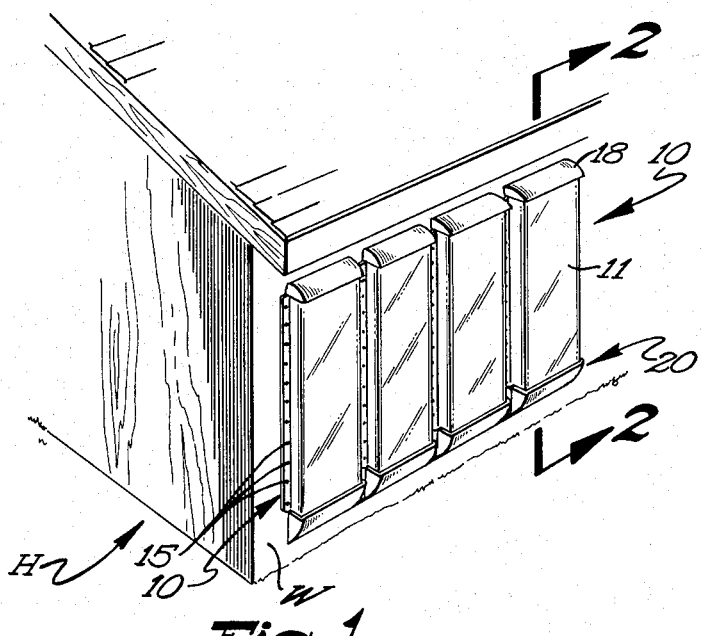
FIG. 1 is a perspective view of a portion of a building illustrating one embodiment of my novel solar collector attached thereto.

Referring now to the drawings and more particularly to FIG. 1, it will be seen that one embodiment of my novel solar collector is thereshown and is designated generally by the reference numeral 10. It will further be noted in FIGS. 1 to 3, that the solar collector 10 has been illustrated, by way of example, as being attached to the wall W of the house H to receive solar energy to thereby serve as a source of heat and energy.

Figure 2:
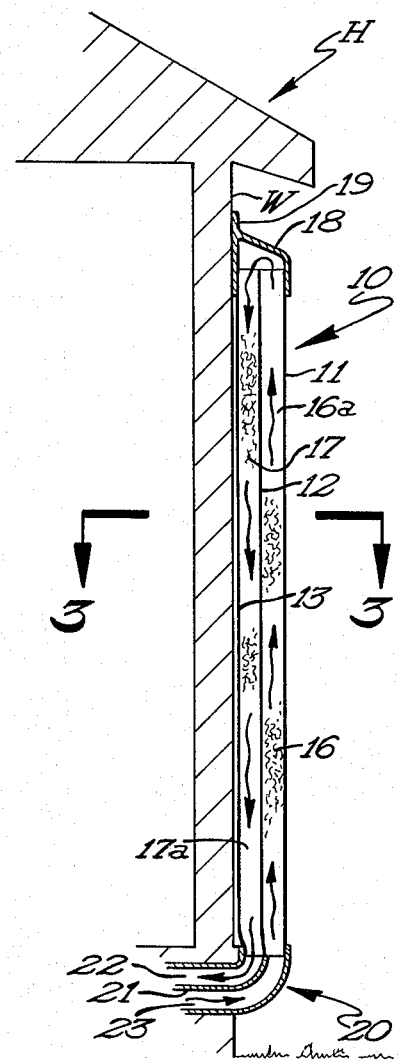
FIG. 2 is a vertical sectional view of the solar collector taken approximately along line 2—2 of FIG. 1 and looking in the direction of the arrows.
Figure 3:
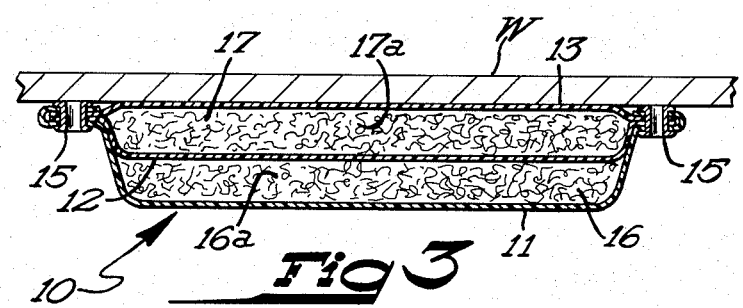
FIG. 3 is a cross-sectional view taken approximately along line 3—3 of FIG. 2 and looking in the direction of the arrows.

Referring now to FIGS. 2 and 3, it will be seen that the solar collector 10 is of flexible tubular construction and is comprised of a generally rectangular shaped flat front panel or sheet 11, an intermediate panel or sheet 12 and a rear panel or sheet 13. It is preferred that these panels be formed of a suitable air impervious flexible material, such as polyethylene, polypropylene or the like. It is pointed out that the front panel 11 and the intermediate panel 12 must have light transmitting properties and therefore must be transparent or translucent but can not be opaque. The rear panel 13 may be formed of black or reflective material, if desired. The longitudinal edges of the front, intermediate and rear panels are securely joined together by any process that will securely seal the edges, such as by heat sealing or the use of a tube of light transmissive material into which is inserted the two layers of fibrous material with the aforementioned intermediate panel 12 between them. The sealed edges may then be provided with attachment means such as grommet type openings 15 for attachment to the structure such as the wall W of the house H. In the embodiment shown in FIGS. 1 through 4, the front, intermediate and rear panels are separate pieces although the front and rear panels may be formed from a single blank folded longitudinally upon itself and having the intermediate panel interposed therebetween. When the solar collector is so formed, the longitudinal edges thereof may also be heat sealed or otherwise secured together.

It will be noted that the intermediate panel 12 cooperates with the front and rear panels to form a front chamber or passage 16 and a rear chamber or passage 17. The front chamber 16 is provided with a fibrous heat absorber 16a and the rear chamber 17 has a fibrous heat absorber 17a positioned therein. It will be noted that the heat absorbers substantially fill their respective chambers and each heat absorber is preferably formed of a fibrous material, such as glass fibers or metallic fibers such as a matrix of finely expanded aluminum or the like. The metallic heat absorber will be more fully described hereinbelow.

When the solar collector 10 is secured to a structure, such as the wall W and the house H, the grommet opening 15 will be secured to grommet-type snaps on the structure or may be applied thereto by nails or the like. It is further pointed out that the collector 10 may be applied to the roof of a house as well as the sides or top wall of a structure. One end of the solar collector is provided with an impervious cap 18 which is securely sealed to the front and rear panels of the collector by tape or any other suitable security means, and this cap 18 may be secured to the associated structure. In the embodiment shown, the cap 18 is secured to the upper end of the collector 10 and is secured to the wall W of the house H. The cap 18 serves to interconnect the front and rear chambers of the solar collector in communicating relation.

The other end of the collector 10 is provided with an elbow 20 which may be formed of a suitable plastic or the like and which is provided with an intermediate wall 21 to define a passage 22 and a passage 23. The passage 22 is connected in communicating relation with the inner chamber 17, and the passage 23 is connected in communicating relation with the outer chamber 16. The passages 22 and 23 may be connected in communicating relation with a room, heat exchanger or heat storage means to be heated so that the air is circulated through the room, heat exchanger or heat storage means. In the embodiment shown, the air to be heated is directed from the inner chamber 17 through the passage 22 to the area to be heated and is returned to the collector 10 through the passage 23 into the outer chamber 16. The porous, multi-surface nature of the heat absorbers 16a and 17a presents a large effective surface area for heat absorption of solar energy transmitted through the front panel 11 and intermediate panel 12. It is preferred that the fibrous material 16a and 17a be formed of glass fiber strands such as those found in certain air filtration materials produced by drawing long, unbroken glass fibers upon a reel, or other material of similar construction.

It is also pointed out that the matting of glass fibers comprising the heat absorbers 16a and 17a provides a trapping action with respect to solar energy transmitted through the front panel 11 and intermediate panel 12. In this respect, any solar ray which is not absorbed by the surface it initially strikes will be deflected against adjacent surfaces where absorption will occur within the porous, multi-surfaced heat absorber. It is further pointed out that some of this solar energy will initially strike the deeper surfaces because of the open, random surface pattern. Thus, the porous characteristics of the heat absorber permits initial absorption and trapping action of the solar energy throughout the thickness dimension of the heat absorber. These advantages are also pointed out in my co-pending application, Ser. No. 806,905, filed June 15, 1977, abandoned, and entitled, SOLAR COLLECTOR, and that disclosure is incorporated by reference herein.

Figure 4:
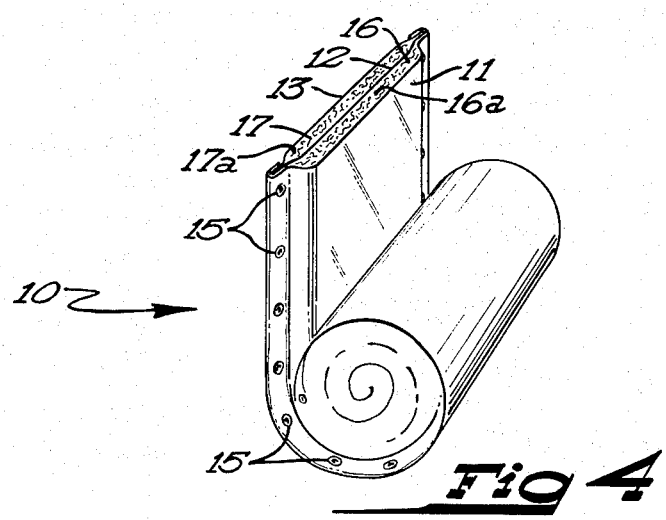
FIG. 4 is a perspective view of the solar collector which has been detached and which has been rolled into a roll for storage.

One of the advantages of the solar collector 10 is the capability of readily attaching and readily removing the collector from any structure where heat energy is needed. In this respect, the solar collector 10 may be mounted on grain dryers or any agricultural building having a need for heat energy. The solar collector 10 may be attached to any portion of such a structure and need not be attached to a particular wall or the roof or top of such a structure. Further, when the solar collector 10 is no longer needed to provide heat energy, the collector may be readily removed from the structure and may be rolled into a roll of small compass, as illustrated in FIG. 4, thereby permitting the collector to be stored or for certain applications, as inside a room, it may be conveniently rolled up and down on a spring roller, similar to the action of a window shade. Because of this characteristic, the solar collector is specially adapted for mobile house trailers and apartments.

Referring now to FIG. 5, it will be seen that a further embodiment of the solar collector is thereshown. The solar collector, illustrated in FIG. 5, is designated generally by reference numeral 25, and is preferably a plate-type solar collector and may be attached or mounted on or in the external wall of a building. The collector 25 includes a light transmissive member 26 which is formed of a light transmissive material such as glass, plexi-glass or any light transmissive material. It may be mounted on the building in the manner illustrated in my co-pending application, Ser. No. 806,905. In this respect, the cover plate will be spaced from the building wall 28 to define a chamber 30 therebetween. A fibrous type heat absorber 27 is positioned within the chamber 30, the heat absorber preferably formed of a matting of glass fibers or the like. It will be noted that the thickness dimension of the fibrous heat absorber 27 is less than the thickness dimension of the chamber 30 so that the front surface 29 of the heat absorber is spaced from the rear surface 26a of the light transmissive member 26 to thereby define a volumetric space 31 between the heat absorber and the light transmissive cover. When air is circulated through the collector, air will pass through the fibrous heat absorber and also through the volumetric space or channel 31. The air passing through the fibrous heat absorber will be readily heated by the heat exchange action between the heat absorber and the air. However, the air passing through the narrow channel or space 31 serves to reduce the temperature of the inner surface 26a of the light transmissive cover 26 and thereby minimize the heat loss through the cover. It has been found that by reducing the temperature of the inner surface 26a of the light transmissive cover, the overall gross efficiency of the collector may be very noticeably increased.

Referring now to FIG. 6, it will be seen that a further embodiment of my novel solar collector is thereshown and is generally similar to the plate-type collector illustrated in FIG. 5. Thus, the solar collector of FIG. 6, designated generally by the reference numeral 32, includes a light transmissive member 33 which is spaced from the rear member 34 which may be part of the structure to which the solar collector 32 is attached. The volumetric space between the air impervious light transmissive cover 33 and the rear member 34 contains a front heat absorber 38 and a rear heat absorber 39, each being formed of a fibrous mating, preferably glass fibers or the like. A membrane 35 is interposed between the rear heat absorber 39 and the front heat absorber 38, and is preferably formed of a suitable plastic such as that sold under the tradename, Mylar or Tedlar. The membrane 35 is light transmissive and therefore may be transparent or translucent. The heat absorber 38 may be a lighter color than the heat absorber 39.

Therefore, when solar energy passes through the light transmissive cover 33, much of the incident solar radiation will also be transmitted through the membrane 35 and will be absorbed by the heat absorber 39. As the heat absorber 39 becomes warmed by radiation, it will radiate some of its heat by emission of its own electro-magnetic radiation. Since much of this radiation will be in the infra-red portion of the electromagnetic spectrum, it will be efficiently absorbed by the membrane 35. It is pointed out that while the membrane 35 transmits visible radiation, it is nearly opaque to radiation in the far infra-red portion of the electromagnetic spectrum and will therefore absorb much of this far infra-red radiation. Thus, the fluid going past both sides of the light transmissive membrane 35 efficiently gathers the heat from the membrane and carries it from the collector for use. With this arrangement, the transparent cover 33 is shielded, in effect, from the infra-red radiation emitted by the heat absorber 39, and therefore the cover plate is maintained at a cooler temperature than it would have been if there was no such membrane 35. The membrane 35 need not be rigid nor is it necessary to attach the membrane to either of the associated heat absorbers. It is only necessary that the membrane be interposed between the two heat absorbers so that it may act as a radiation barrier.

Referring now to FIG. 7, it will be seen that another embodiment of my novel solar collector, designated generally by the reference numeral 40, is thereshown. The solar collector 40 is also similar in construction to the solar collectors illustrated in FIGS. 5 and 6 and is a plate-type collector having a light transmissive cover 41 formed of a fluid impervious material and positioned in spaced relation with respect to a rear wall 42 which may be the wall of a building or structure on or into which the collector is constructed. The volumetric space between the light transmissive cover and the rear wall defines a chamber 43 which accommodates a front heat absorber 44 and a rear heat absorber 45 therein. The heat absorbers are formed of a fibrous material, preferably glass fibers or the like, and the heat absorber 45 is preferably thicker than the heat absorber 44. The heat absorber 45 is also darker in color than the heat absorber 44. In this respect, the heat absorber 45 may be black while the heat absorber 44 may be any desirable color such as the color scheme of the house with which the solar collector is associated. It has been found that the operation of the solar collector 40 is substantially independent of the color of the outer front heat absorber 44. Therefore, the outer color may range from white to black and gives the user a complete range of selection of color for esthetic purposes. The arrows indicate the action of the solar radiation transmitted through the light transmissive cover 41.

Referring now to FIG. 8, it will be seen that solar collectors are illustrated in attached relation to a wall W of a house H. The solar collectors illustrated are those embodied in FIGS. 1 to 4 and have applied thereto graphic representations 24 and graphic representations 24a. In this respect, the graphic representations 24 may be an esthetic representation, such as a mural, design, building material representation or the like while the graphic representations 24a may be a writing such as advertising material. The graphic illustrations may be applied to any type of solar collector utilizing fibrous heat absorbers. Graphics may also be applied to the cover plate as desired. It is also pointed out that the graphic illustrations may be applied to any of the embodiments of FIGS. 1 through 7 as well as any solar collector. With this arrangement, not only is the esthetic quality of the solar collector enhanced but the solar collector may also be used as an advertising or promotional medium.

Referring now to FIG. 9, it will be seen that a further embodiment of the solar collector, designated generally by the reference numeral 46, is thereshown. The solar collector 46 is generally similar to the collectors illustrated in the embodiments of FIGS. 5, 6 and 7 and comprises a plate-type collector having a light transmissive cover 47 mounted in spaced relation to a rear wall or member 48. Again, it is pointed out that the wall 48 may be the wall of a building on or into which the solar collector 46 is constructed. The volumetric space between the light transmissive cover 47 and the rear member 48 defines a chamber 49 which contains a heat absorber 50 which is formed of metal fibers such as fine, elongate metal strands or a matrix of expanded metal, such as aluminum, galvanized iron, or the like. When used herein, the terms "metal fibers", "metal strands", "metallic fibers" or "metallic strands" refer to fine elongate metal strands, a matrix of expanded metal, or the like. The metallic strands have been treated to form a thin layer of substance on the surface of the metal which acts to enhance the amount of solar radiation absorbed by the metallic strands, by tending to reduce reflectivity from its still somewhat shiny surface while retaining the tendency of the metal to act as a poor emitter of infrared radiation. This treatment may constitute a caustic etch, such as sodium hydroxide or the like, or a suitable oxidizing agent such as hot hydrogen peroxide so that an oxide coating is formed which will not flake. The treatment may also include an acid bath such as oxalic acid or the like. The treatment may also be applied by electroplating, anodizing or any other method which can produce a slightly dulled surface finish of the required thickness. It is preferred that the fibers comprising the heat absorber 50 have a shiny surface prior to treatment. Treatment need not blacken the metallic fibers as is the case in conventional selective surface absorbers because the geometric trapping of incident solar rays due to successive reflections within the absorber insures that solar absorption is nearly complete. Therefore, the performance of the absorber will be adequately high if the metal, after treatment, possesses a solar absorption coefficient no greater than 0.5. It is important to observe that this enables the absorber to be produced at a markedly reduced cost as compared to conventional selective surface absorbers. It is pointed out, however, that the coating should be quite thin in order to obtain maximum efficiency. In this respect, if the coating has a thickness dimension less than the wave length of infra-red radiation, that is, less than approximately six microns thick, then the coating will not appreciably affect the inherent tendency of most metals to be poor infra-red emitters and consequently, heat loss from the absorber by infra-red radiation is greatly suppressed. It has therefore been found that with this type of arrangement, the solar collector 46 can produce high output temperatures, in the range of two hundred degrees Celsius. In ordinary flat plate collectors infra-red radiation generally limits the achieved temperatures to less than 100° Celsius.

In the production of a high efficiency absorber comprised of a number of strips of finely expanded metal, such as aluminum, galvinized iron, or the like, the absorber should preferably be constructed by cutting the expanded metal into strips and placing the strips into the absorber chamber area on edge. The width of such strips should equal the desired absorber thickness. It is further pointed out that an absorber composed of a matrix of coated or treated metallic fibers or of coated or treated expanded metal, as herein described, can be used as the absorber 17a in FIGS. 2-4, as the absorber 27 in FIG. 5, as the absorber 39 in FIG. 6, and as the absorber 45 in FIG. 7.

From the foregoing description, it will be seen that I have provided a novel solar collector which is not only of simple and inexpensive construction, but one which functions in a highly efficient manner.

What is claimed is:

1. A solar collector adapted to be releasably attached to a building structure comprising:
   an elongate, flexible tubular member comprised of front, intermediate and rear panels each being formed of a flexible fluid impervious material, said front and intermediate panels being light transmissive to permit solar energy to be transmitted therethrough, said intermediate panel cooperating with said front and rear panels to form said tubular member into front and rear chambers, means connecting with one end of said tubular member interconnecting said chambers in communicating relation, conduit means connected with the other end of said tubular members for communicating each of said chambers with an area to be heated whereby fluid to be heated will flow through one of the chambers to the area to be heated, and will be returned through the other of said chambers, and first and second fibrous heat absorbers each being positioned in one of said chambers, the first fibrous heat absorber being positioned between the front and intermediate panels and being sufficiently porous to permit at least some solar energy to be transmitted therethrough whereby when said solar collector is attached to a structure, solar energy will be transmitted through the front panel to the first fibrous heat absorber, and through the first fibrous heat absorber and the intermediate panel to heat both fibrous heat absorbers from solar energy to thereby transfer heat to fluid passing through said fibrous heat absorbers in said chambers.

2. The solar collector as defined in claim 1 wherein said fibrous heat absorbers are formed of glass fibers.

3. The solar collector as defined in claim 1 wherein at least one of said fibrous heat absorbers is formed of metallic fibers.

4. The solar collector as defined in claim 1 wherein said rear panel is reflective.

5. The solar collector as defined in claim 1 and attachment means on said collector member for attachment to cooperating attachment means on the building structure.

6. A solar collector as defined in claim 1 wherein said collector members when removed from said building structure may be rolled into a roll of small compass.

7. The solar collector as defined in claim 1 and graphic representations applied to the front panel of said collector member.

8. The solar collector as defined in claim 1 wherein certain of said fibers of the heat absorber positioned adjacent said front panel is pigmented so as to form a graphic representation.

9. The solar collector of claim 1 wherein said tubular member extends uprightly and has a lower end and an upper end, and said conduit means is connected with the lower end of the tubular member.

10. A process for making a flexible solar collector comprising:

positioning an elongate, flexible, light transmissive sheet between a pair of elongate, flexible heat absorbers, each heat absorber comprising a matrix of fibers of such density that at least some solar energy striking the heat absorbers is transmitted through the matrix of fibers in direction normal to the sheet, inserting the pair of heat absorbers and sheet into an elongate, gas impervious, light transmissive tubular member, securing the longitudinal edges of the sheet to opposite portions of the tubular member in sealing relation thereto to form the tubular member into a pair of chambers each containing one of said heat absorbers.

11. A process for making a flexible solar collector comprising:

positioning an elongate, flexible, light transmissive sheet between a pair of elongate, flexible heat absorbers, each comprising a matrix of fibers, positioning the pair of heat absorbers and sheet on a generally rectangular, flexible, light transmissive panel, the latter having a width dimension approximately twice as great as the width dimension of each heat absorber and sheet, one longitudinal edge of the sheet and heat absorber being positioned adjacent one longitudinal edge of the panel, folding the panel upon itself and securing the longitudinal edges thereof to the adjacent longitudinal edge of the sheet, securing the fold line portion of the panel to the other longitudinal edge of the sheet to form a double-chambered solar collector.

12. A process for making a flexible solar collector comprising:

positioning an elongate, flexible, light transmissive sheet between a pair of elongate, flexible, heat absorbers, each heat absorber comprising a matrix of fibers, positioning the pair of heat absorbers and sheet between a pair of elongate, generally rectangular-shaped, light transmissive, flexible panels, each panel having length and width dimensions corresponding to the length and width dimensions of the heat absorbers and sheet, securing the longitudinal edges of the panels to the longitudinal edges of the sheet to form an elongate, double-chambered tubular solar collector, each chamber containing one of said heat absorbers.

* * * * *